INVENTOR.
JOHN L. DAILEY

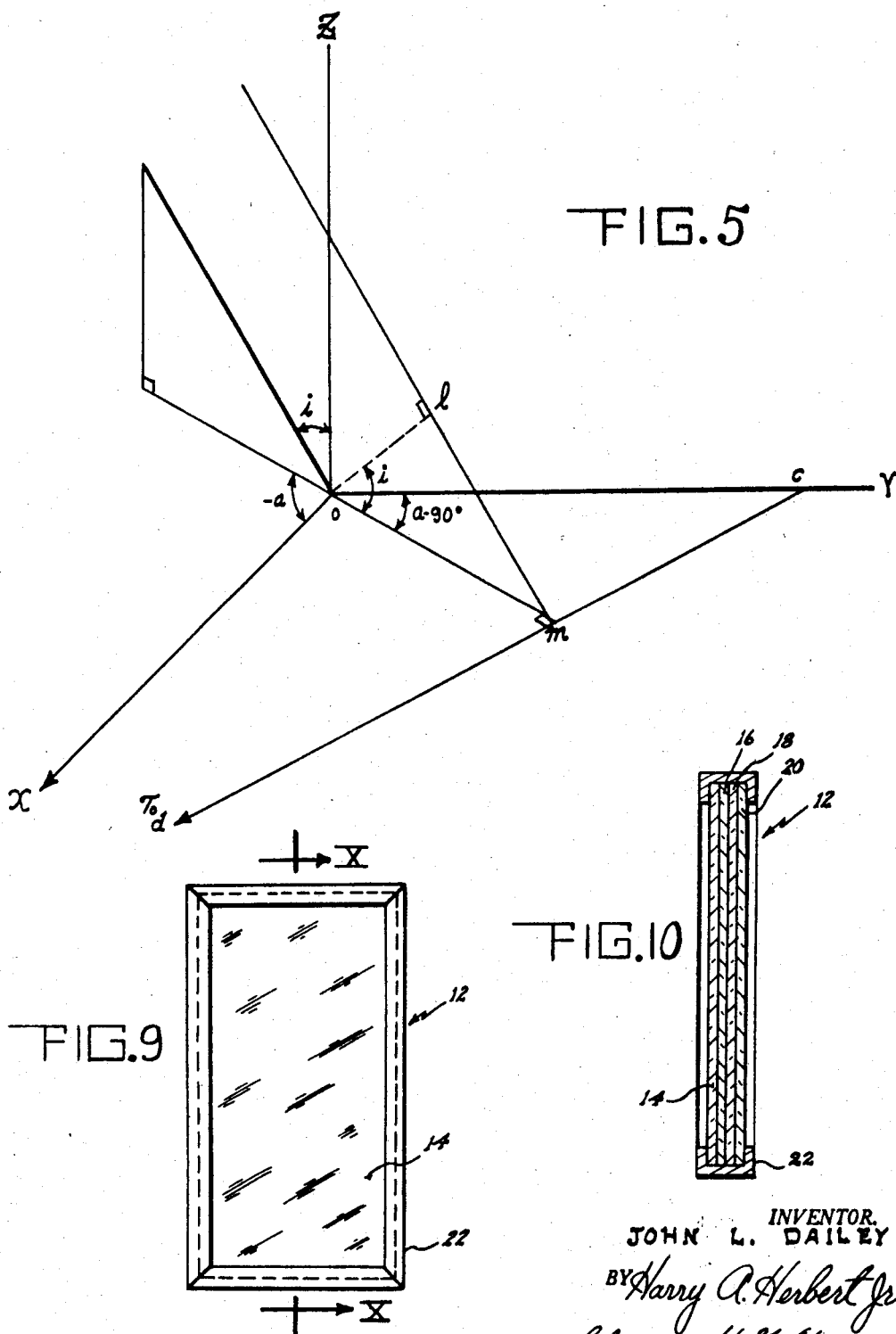

United States Patent Office 3,429,635
Patented Feb. 25, 1969

3,429,635
COMPENSATED GENERALIZED SAVART PLATE
John L. Dailey, West Berlin, N.J., assignor to the United States of America as represented by the Secretary of the Air Force
Filed Apr. 12, 1965, Ser. No. 447,589
U.S. Cl. 350—157                    12 Claims
Int. Cl. G02f *1/24;* G02b *21/06, 21/14*

ABSTRACT OF THE DISCLOSURE

A linear, birefringent, combination plate which comprises a pair of Savart plates, each of which comprises two plates, wherein all of the plates are cut from a uniaxial crystal and joined in a superposed relation with one Savart plate rotated 90° about the plate normal with respect to position in which the optic axis of one of the Savart plates is parallel to the corresponding axis of the other Savart plate. In one embodiment adjacent plates of the Savart plates are combined to a single plate of double thickness. The angle of the cut of the individual plates of the Savart plates with respect to the optic axis of the uniaxial crystal is the same for each plate and is greater than 0°, the angle chosen being determinative of the spacing of the interference lines of the assembly of plates when viewed in polarized light. Variations in thickness, birefringence of the crystal or the aforementioned cutting angle provide variations in the angular line separation of the interference pattern of the assembled combination of plates when viewed in polarized light. Cycle angles of 10° are made possible by the use of the compensated plate thereby improving the utilization of the assembly as an angle sensing unit.

---

This invention relates generally to Savart plates and more particularly to a modification thereof which eliminates the disadvantages of the conventional Savart plate arrangement.

Savart plates have the disadvantage of being nonlinear and require extremely thin plates in order to allow for widely spaced interference lines. The modification of the Savart plate proposed by this invention renders the device linear such that it can serve better in interferometry applications as well as being suited for use in a system for measuring angles at a distance, such as the measurement of missile attitude.

Accordingly, it is the primary object of this invention to provide a modified Savart plate arrangement which is linear.

It is another object of this invention to provide a modified Savart plate which allows for accurate control of its parameters to achieve a desired effect.

It is still another object of this invention to provide a modified Savart plate which requires less closely held tolerances.

It is a further object of this invention to provide a modified Savart plate which, in addition to being linear, may have its line spacing varied at constant plate thickness.

It is a still further object of this invention to provide a Savart plate modification wherein the phase shift caused by the plate in polarized light may be made much more uniform across the face of the plate.

Another object of this invention involves the provision of a modified Savart plate which can be manufactured to greater accuracy than can the standard Savart plate.

Still another object of this invention involves the provision of a modified Savart plate which is easy and economical to produce of standard materials that lend themselves to mass production manufacturing techniques.

These and other advantages, features and objects of the invention will become more apparent from the following description taken in connection with the illustrative embodiment in the accompanying drawings, wherein:

FIGURES 1 through 8 are schematic representations utilized to illustrate the mathematical derivation of the compensated Savart plate;

FIGURE 9 is a plan view of an assembled compensated Savart plate; and

FIGURE 10 is a sectional view taken along lines X—X of FIGURE 9.

Figure 1:
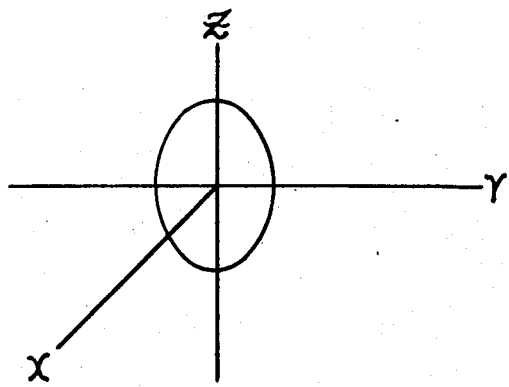

With the Savart plate it is usually considered that the interference pattern of the plate, when viewed in polarized light, consists of parallel straight dark and light lines. The phase shift induced by a Savart plate in a transmitted beam of light is therefore ordinarily expressed by $\delta = k \sin i \sin a$, where $i$ and $a$ are incidence and azimuth of the beam, respectively. Some writers, perceiving the existence of a second order term in the phase shift, have expressed it as $\delta = k_1 \sin i \sin a + k_2 \sin^2 i (\sin^2 a - \cos^2 a)$. This second order term indicates that the interference lines are actually curved, impairing the suitability of the plate for angle measuring. Moreover, the line spacing of the interference pattern severely limits the angular range of a potential device unless the crystal plates are lapped to extreme thinness. Savart plates are cut at an angle of 45° to the optic axis. The equation for plates cut at other angles will be derived and it will be shown that for a given thickness, the angular line spacing, ordinarily very small, may be set at any arbitrary angle by selecting an appropriate cutting angle. It will be seen that the curvature of the lines increases as the cutting angle varies from 45°, but a method of compensation will be described by which the second order term of the plate may be removed altogether so that a linear device of controllable parameters is achieved.

A Savart double plate is formed by cutting a pair of plates from a uniaxial crystal, usually quartz, at an angle of 45° to the optic axis and superposing them so that one plate is rotated 90° with respect to the other relative to their positions before cutting. In this position, the projections of the optic axes of the two plates upon a common surface are at a right angle to one another. Linearly polarized light whose plane of vibration bisects the right angle thus formed will be resolved, upon entering the Savart plate, into two rays vibrating parallel to these axes. Upon emergence, there will be a phase shift between them which is a function of $i$ and $a$, the angle of incidence of the beam and its azimuth with respect to the $x$ axis of the plate, which will coincide with one of the projected axes. If two such plates are set side by side, with one rotated 90° from the other, and a different wavelength of appropriately polarized light is transmitted through each, the beam may be analyzed anywhere along its length to determine the polarization states of the two wavelengths, and if $$\delta_{\lambda_1} = k_1 \sin i \sin a$$

$$\delta_{\lambda_2} = k_2 \sin i \cos a$$

then $i$ and $a$ may be determined to find the plate orientation relative to the beam. For a three-dimensional system, the fact that the amplitudes of the two rays in the plate, $E_x$ and $E_y$, are equal may be used to determine rotation about the beam. To use a Savart plate for such an angle measuring purpose, the plate itself must meet certain requirements. First, unless the computation is to be excessively burdensome, the second order terms must be removed from the induced phase shift. Secondly, the cycle angle, the angle by which $i$ must change at $a=90°$ (referring to $\delta_{\lambda_1}$) or $a=0°$ (referring to $\delta_{\lambda_2}$) to accomplish a change of one cycle in $\delta$, must be larger than the anticipated angular range of the system or ambiguities will result. Also, the cycle angle must be large in terms of the angle subtended by the plate at the point of observation, for the sake of precision. Thirdly, the tolerances to which the plate is made must be such that the errors induced by nonuniform plate thickness are smaller than the desired resolution in terms of phase shift. Suppose, for instance, that a plate has a cycle angle of 10° and it is desired to use it to measure angles to ±0.1°. The induced phase shift must then be accurate to better than 1%. For quartz plates cut at 45°, the birefringence along a normal to the plates is .0046 and the plates would have to be flat to better than one-half wavelength, averaged over the four surfaces, and the two plates would have to be matched in thickness to better than two wavelengths, parallelism included. While this is not technically difficult if a single plate is polished to the requisite flatness and parallelism and then split to form two plates, in the case where the finished plate must be nearly as large as the available crystals, the difficulty is significant.

An additional difficulty is that the specific rotation of quartz makes it unsuitable for Savart plate applications if high precision is needed. Since quartz represents about the lowest birefringence among the easily available uniaxial crystals, a larger birefringence must be used and all the other problems are amplified accordingly.

A solution to these difficulties is described here. First, the cutting angle will be varied from 45° toward the optic axis to reduce birefringence along the plate normal. Secondly, a method of compensation will be described by which the second order terms will be removed from the phase shift, resulting in a linear device more suited to the purpose.

The ellipsoid which describes the ray velocity surface in an uniaxial crystal is given by $$n_e^2 x^2 + n_e^2 y^2 + n_o^2 z^2 = 1 \quad (1)$$

and the optic axis is parallel to the z axis, as in FIGURE 1.

Figure 2:
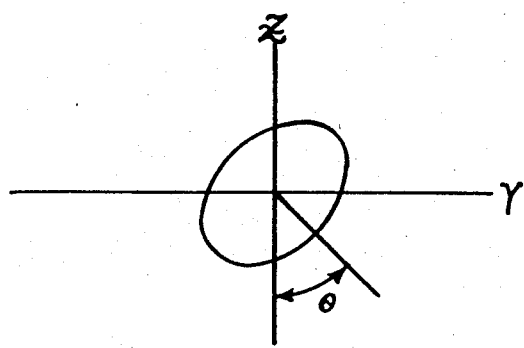

If the ellipsoid is rotated about the x axis so that positive y moves toward positive z by an angle $\theta$, as shown in FIGURE 2, the equation of the ellipsoid becomes, $$n_e^2 x^2 + (n_e^2 \cos^2 \theta + n_o^2 \sin^2 \theta) y^2 + (n_e^2 \sin^2 \theta + n_e^2 \cos^2 \theta) z^2 + 2(n_o^2 - n_e^2) \sin \theta \cos \theta yz = 1 \quad (2)$$

Figure 3:
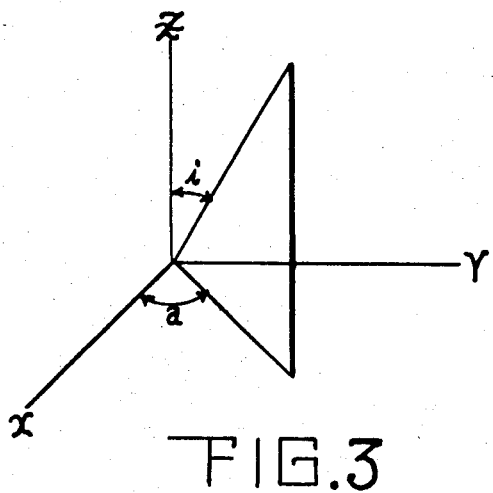

If a crystal is cut so that the x–y plane in FIGURE 2 forms the surface, the direction of refraction of a ray incident at the origin of the ellipsoid may be determined by Huygen's construction. If the angle between the incident ray and the z axis is indicated by $i$ and the positive angle between the projection of the incident ray onto the x–y plane and the x axis is indicated by $a$, as in FIGURE 3, then the line which describes the incident ray is given by $$y = x \tan a$$
$$z = \frac{x \cot i}{\cos a} \quad (3)$$

Figure 4:
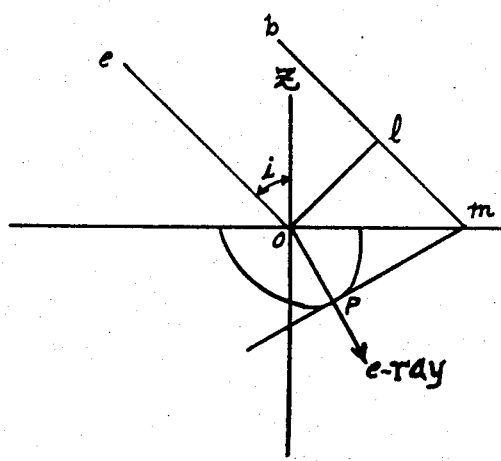

FIGURE 4 illustrates the technique for finding the direction for a refracted e-ray by Huygen's construction.

The line $eo$ represents an incident e-ray and $bm$ is a second e-ray parallel to it. The line $ol$ is perpendicular to both rays and therefore represents a segment of wavefront. The distance $om$ is so chosen that $l$ and $m$ are separated by one wavelength. Since the radius of the ray-velocity surface ellipsoid is by definition one wavelength in the refracting medium, and since the waves at $o$ and $l$ are in phase, a wave at the surface of the ellipsoid is in phase with a wave at $m$. If a line is erected in the x–y plane perpendicular to $lm$, a plane through this line and tangent to the ellipsoid will be tangent at the point where the refracted e-ray from the origin passes through the ellipsoid. Therefore, $op$ is in the direction of the refracted ray.

The equation for a line in the x–y plane, through $m$ and perpendicular to $lm$ can be found by analyzing FIGURE 5.

If the unit of distance is the wavelength, and if only monochromatic light is considered, then $$lm = 1 \quad (4)$$

and $$om = \frac{1}{\sin i} \quad (5)$$

The intercepts of the line $cd$, shown in FIGURE 5, may easily be found to be $$x = \frac{1}{\sin i \cos a}$$

$$y = \frac{1}{\sin i \sin a} \quad (6)$$

and the equation of the line along $cd$ is $$y = -x \cot a + \frac{1}{\sin i \sin a} z = 0 \quad (7)$$

If $$A = n_e^2$$
$$B = n_e^2 \cos^2 \theta + n_o^2 \sin^2 \theta$$
$$C = n_e^2 \sin^2 \theta + n_o^2 \cos^2 \theta$$
$$D = (n_o^2 - n_e^2) \sin \theta \cos \theta \quad (8)$$

then Equation 2 may be written $$Ax^2 + By^2 + Cz^2 + 2Dyz = 1 \quad (9)$$

If $P = (x_1, y_1, z_1)$, the equation of a plane tangent to this ellipsoid at P is $$Ax_1 x + By_1 y + Cz_1 z + D(z_1 y + y_1 z) = 1 \quad (10)$$

Three points which lie in this plane are $$(x_1, y_1, z_1)$$

$$\left( \frac{1}{\sin i \cos a}, 0, 0 \right)$$

$$\left( 0, \frac{1}{\sin i \sin a}, 0 \right)$$

the latter two being obtained from Equation 6.

Substituting the x, y and z values of these points into Equation 10 results in three simultaneous equations for the tangent plane.

$$Ax_1^2 + By_1^2 + Cz_1^2 + 2Dy_1 z_1 = 1$$
$$Ax_1 = \sin i \cos a$$
$$By_1 + Dx_1 = \sin i \sin a \quad (11)$$

Solving for $x_1$, $y_1$ and $z_1$ and making the substitutions in (8) yields $$x_1 = \frac{1}{n_e^2} \sin i \cos a$$

$$y_1 = \frac{\sin i \sin a}{n_e^2 \cos^2 \theta + n_o^2 \sin^2 \theta} - \frac{(n_o^2 - n_e^2) \sin \theta \cos \theta z_1}{n_e^2 \cos^2 \theta + n_o^2 \sin^2 \theta}$$

$$z_1 = \frac{1}{n_o n_e} \cdot \sqrt{n_o^2 \cos^2 \theta + n_e^2 \sin^2 \theta}$$

$$\sqrt{1 - \sin^2 i \left( \frac{\cos^2 a}{n_e^2} + \frac{\sin^2 a}{n_e^2 \cos^2 \theta + n_o^2 \sin^2 \theta} \right)}$$

(12)

which are the coordinates of the point at which the refracted e-ray passes through the ray velocity surface.

Figure 6:
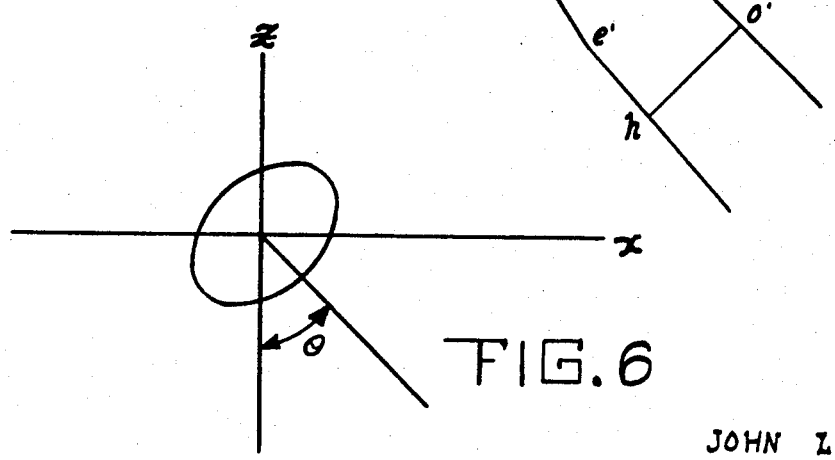

If, instead of the ellipsoid of the ray velocity surface being rotated in the y–z plane, as in FIGURE 2, it is rotated in the x–z plane, with positive x being rotated toward positive z by the same angle $\theta$ as previously, as shown in FIGURE 6, the equation of the ellipsoid becomes $$(n_e^2 \cos^2 \theta + n_o^2 \sin^2 \theta)x^2 + n_e^2 y^2 + (n_e^2 \sin^2 \theta + n_o^2 \cos^2 \theta)z^2 + 2(n_o^2 - n_e^2)\sin\theta\cos\theta\, xz = 1 \quad (13)$$

In this case, Equations 3 through 8 apply unchanged. The ellipsoid equation may be written $$Bx^2 + Ay^2 + Cz^2 + 2Dzx = 1 \quad (14)$$

The expression for the tangent plane becomes $$Bx_1 x + Ay_1 y + Cz_1 z + D(z_1 x + x_1 z) = 1 \quad (15)$$

which is satisfied by the same three points as in the previous case. The simultaneous equations are $$Bx_1^2 + Ay_1^2 + Cz_1^2 + 2Dx_1 z_1 = 1$$
$$Bx_1 + Dz_1 = \sin i \cos a \quad (16)$$
$$Ay_1 = \sin i \sin a$$

When Equations 16 are solved and the abbreviations removed, the result is $$x_1 = \frac{\sin i \cos a}{n_e^2 \cos^2 \theta + n_o^2 \sin^2 \theta} - \frac{(n_o^2 - n_e^2)\sin\theta\cos\theta\, z_1}{n_e^2 \cos^2 \theta + n_o^2 \sin^2 \theta}$$

$$y_1 = \frac{1}{n_e^2} \sin i \sin a$$

$$z_1 = \frac{\sqrt{n_o^2 \cos^2\theta + n_e^2 \sin^2\theta}}{n_e n_o}$$

$$\sqrt{1 - \sin^2 i \left(\frac{\sin^2 i}{n_e^2} + \frac{\cos^2 a}{n_e^2 \cos^2\theta + n_o^2 \sin^2\theta}\right)} \quad (17)$$

From Equations 12 and 17, the direction of the refracted $e$-ray may be found for either plate. Since both plates must be considered in the derivation of a Savart double plate, a distinction between them will be made by changing the notation for the plate whose ellipsoid was rotated about the $y$ axis to primed values, so that the values of Equation 12 are $x_1$, $y_1$ and $z_1$ and those of Equation 17 are $x_1'$, $y_1'$ and $z_1'$.

If an $e$-ray enters a birefringent crystal plate at point $(0, 0, 0)$ and passes through the ray velocity ellipsoid at point $(x_1, y_1, z_1)$, it will emerge from the crystal at point $(x_e, y_e, z_e)$, given by $$x_e = T \frac{x_1}{z_1}$$

$$y_e = T \frac{y_1}{z_1}$$

$$z_e = T \quad (18)$$

where T is the thickness of the plate.

The distance which lies along this path is obviously $$D_e = \sqrt{x_e^2 + y_e^2 + z_e^2} \quad (19)$$

and the wavelength along this path is, by definition of the ray velocity ellipsoid, $$\lambda_e = \sqrt{x_1^2 + y_1^2 + z_1^2} \quad (20)$$

The number of wavelengths which lie along this path is obtained by dividing the pathlength by the wavelength. When the values in (18) are substituted into (19), this becomes $$\frac{D_e}{\lambda_e} = \frac{T}{z_1} \quad (21)$$

This expression for the $e$-ray can be made to apply to the $e$-ray by setting $n_e = n_o$ in the expression for $z_1$. The number of waves may then be indicated by $D_o/\lambda_o$.

Figure 7:
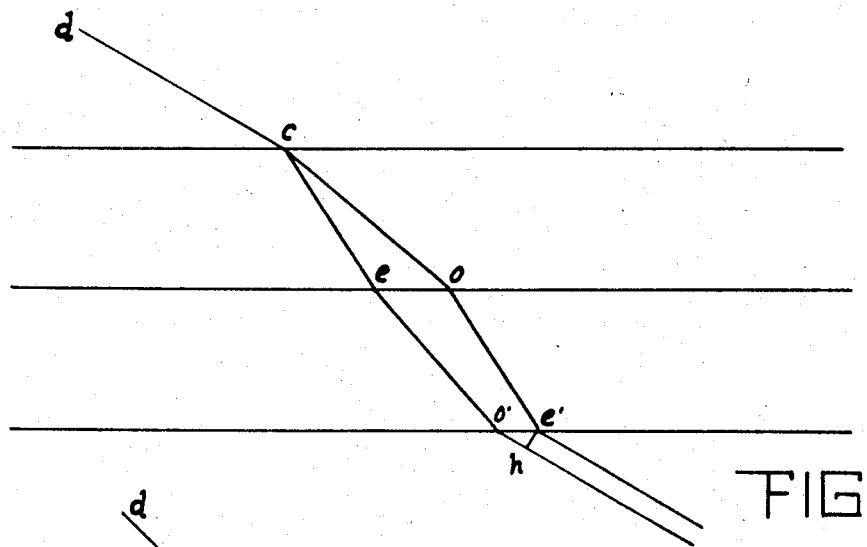

If the two plates for which $e$-ray directions have been derived are superimposed, as in FIGURE 7, the projection of the optic axis of the first plate on the upper surface is parallel to the $y$ axis of the system and the projection of the optic axis of the second plate is parallel to the $x$ axis.

Figure 8:
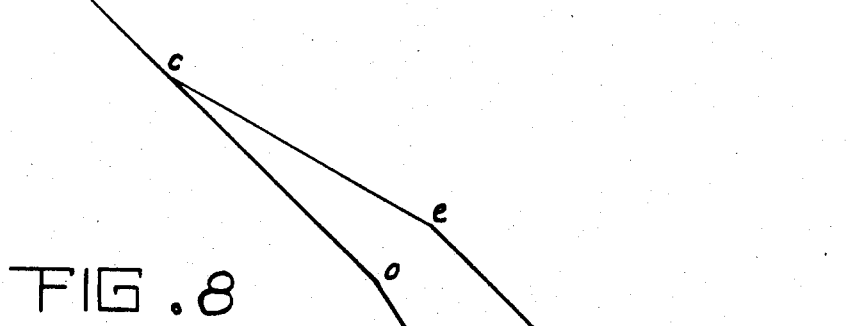

A linearly polarized ray which is vibrating in a plane which lies at a 45° angle to this axis and incident at the point $c$ in the direction $dc$, will be split by double refraction into two components of equal amplitude with vibration planes parallel to the plate's $x$ and $y$ axes respectively. The ray vibrating in the $xz$ plane will be refracted as an ordinary ray and proceed from $c$ to $o$ according to Snell's law. The ray vibrating in the $y$–$z$ plane is refracted as an extraordinary ray and proceeds toward $e$. At the interface, the roles of ordinary and extraordinary ray are interchanged, since the optic axis of the second plate lies in the $x$–$z$ plane. The ray vibrating in the $x$–$y$ plane is refracted at $e$ in the direction it would take if incident from air and proceeds toward $o'$ in a direction parallel to $co$. The new extraordinary ray, however, is not refracted parallel to $co$. In the general case, an $e$-ray is refracted out of the plane of incidence, going left or right according to the orientation of the optic axis and whether the crystal is positive or negative. Because of the difference in orientation of the optic axes of the two plates, if the $e$-ray of the first plate is refracted to the right, the $e$-ray of the second plate will be refracted to the left, and vice-versa. Thus, the ray diagram of FIGURE 7 should actually be a three dimensional figure and FIGURE 7 only represents the projections of the ray paths on some plane. The projection of the same ray paths on the plate surface is shown in FIGURE 8.

The two rays therefore emerge from the second plate at different points and are refracted into the air in a direction parallel to $dc$. A plane through $e'$ and a plane through $o'$, both perpendicular to $dc$, represent wave fronts of the two rays. The separation of the two planes is therefore the retardation of one ray relative to the other if they are in phase along the first surface. If they are not, the retardation at the crystal surface must be computed and added. The total retardation may be written as the number of waves along the path $ceo'h$ minus the number along $coe'$. If the distance $o'h$ is noted by $D_{air}$ and if the previous notation for number of waves is used, with primes denoting the second plate, then $\Delta$, the total retardation, may be written $$\Delta = \frac{D_o}{\lambda_o} + \frac{D_e'}{\lambda_e'} + D_{air} - \frac{D_e}{\lambda_e} - \frac{D_o'}{\lambda_o'} \quad (22)$$

or $$\Delta = \left(\frac{D_o}{\lambda_o} - \frac{D_o'}{\lambda_o'}\right) + \left(\frac{D_e'}{\lambda_e'} - \frac{D_e}{\lambda_e}\right) + D_{air} \quad (23)$$

and using Equation 21, changing notation where appropriate, $$\Delta = T\left(\frac{1}{z_{1o}} - \frac{1}{z_{1o}'}\right) + T\left(\frac{1}{z_{1e}'} - \frac{1}{z_{1e}}\right) + D_{air} \quad (24)$$

where the $o$ in the subscript indicates that $n_e = n_o$ is to be used in evaluating $z_1$, $e$ indicates no change is to be made in $z_1$ and the prime indicates that $z_1$ in Equation 17 is to be used. Lack of a prime indicates $z_1$ of Equation 12. The first term is quite simple to evaluate. At $n_e = n_o$, $z_1 = z_1'$, so $$\frac{1}{z_{1o}} - \frac{1}{z_{1o}'} = 0 \quad (25)$$

and (24) reduces to $$\Delta = D_{air} + T\left(\frac{1}{z_{1e}'} - \frac{1}{z_{1e}}\right) \quad (26)$$

It is not going to be necessary to evaluate the second term in (26). Evaluation of $D_{air}$ will be sufficient to arrive at the ultimate answer.

If the coordinates of points $o'$ and $e'$ are indicated by $(x_o, y_o, 2T)$ and $(X_e, Y_e, 2T)$, the origin of the coordinate system may be translated to $o'$ and the point $e'$ written as $(X_e - X_o, Y_e - Y_o, 0)$. The equation of a plane through this point and perpendicular to the line described by Equation 3 is $$(x-X_e+X_o)\cos a+(y-Y_e+Y_o)\sin a+z\cot i=0 \quad (27)$$

By a standard geometrical technique, its perpendicular distance from point $o'$ may be found to be $$\sin i \, [(X_e-X_o)\cos a+(Y_e-Y_o)\sin a] \quad (28)$$

which is the distance $o'h$ and hence $D_{air}$.

From the geometry of FIGURES 7 and 8, it is obvious that $$X_e=x_o+x_e' \quad Y_e=y_o+y_e'$$
$$X_o=x_e+x_o' \quad Y_o=y_e+y_o' \quad (29)$$

and therefore, $$D_{air}=\sin i\{[(x_o-x_o')+(x_e'-x_e)]\cos a +[(y_o-y_o')+(y_e'-y_e)]\sin a\} \quad (30)$$

Values for $x_o$, $y_o$, $x_o'$ and $y_o'$ may be gotten from Equation 18 by making the indicated changes of $n_e$ to $n_o$ in (12) and (17) and substituting into (18). When this is done, it is found that $$x_o=x_o' \text{ and } y_o=y_o'$$

so that Equation 30 reduces to $$D_{air}=\sin i \, [(x_e'-x_e)\cos a+(y_e'-y_e)\sin a] \quad (31)$$

To evaluate $x_e$, $y_e$, $x_e'$ and $y_e'$, it will be handy to reintroduce the abbreviations of (8). Using these abbreviations and the earlier notation of $x_{1e}$ and $z_{1e}'$, $$x_e=T\frac{x_{1e}}{z_{1e}}=\frac{T\sin i\cos a}{z_{1e}A}$$
$$y_e=T\frac{y_{1e}}{z_{1e}}=\frac{T\sin i\sin a}{z_{1e}B}-\frac{TD}{B}$$
$$x_e'=T\frac{x_{1e}'}{z_{1e}'}=\frac{T\sin i\cos a}{z_{1e}'B}-\frac{TD}{B}$$
$$y_e'=T\frac{y_{1e}'}{z_{1e}'}=\frac{T\sin i\sin a}{z_{1e}'A} \quad (32)$$

Substituting these values into (31) results in $$D_{air}=\frac{TD}{B}\sin i \, (\sin a-\cos a)$$
$$+T\sin^2 i\left[\left(\frac{1}{z_{1e}'A}-\frac{1}{z_{1e}B}\right)\sin^2 a+\left(\frac{1}{z_{1e}'B}-\frac{1}{z_{1e}A}\right)\cos^2 a\right] \quad (33)$$

And, finally, rewriting (26) results in $$\Delta=\frac{TD}{B}\sin i \, (\sin a-\cos a)+T\left(\frac{1}{z_{1e}'}-\frac{1}{z_{1e}}\right)$$
$$+T\sin^2 i\left[\left(\frac{1}{z_{1e}'A}-\frac{1}{z_{1e}B}\right)\sin^2 a+\left(\frac{1}{z_{1e}'B}-\frac{1}{z_{1e}A}\right)\cos^2 a\right] \quad (34)$$

which is the total retardation introduced by the plate. The character of $z_1$ in (12) and (17) indicate that the terms with $z$ in the denominator would be somewhat difficult to evaluate, but it can be seen that the equation consists of a dominant first order term plus a series of second order terms which may become significant at large angles of incidence. The Savart double plate is obviously not the linear device commonly supposed and is not suitable in its standard form for use in a precision angle measuring device.

In Equation 34, the angle $a$ appears only as the $\sin^2 a$ or $\cos^2 a$ in the second order terms, but as $\sin a$ and $\cos a$ in the first order terms. Thus, if a second Savart double plate is superposed upon the first and has its axes rotated 90° from the first, and the two plates are identical before the rotation, the second plate will produce a retardation governed by the same Equation 34 except that it will see the angle $a$ as $a+90°$. Where $a_1$ refers to the first plate and $a_2$ to the second, $$a_2=a_1\pm 90°$$
$$\sin a_2=\pm \cos a_1$$
$$\cos a_2=\mp \sin a_1$$
$$\sin^2 a_2=\cos^2 a_1$$
$$\cos^2 a_2=\sin^2 a_1 \quad (35)$$

Since the only difference between $z_{1e}$ and $z_{1e}'$ is that $\sin^2 a$ and $\cos^2 a$ are interchanged between them, $$z_{1e} \text{ of 1st plate}=z_{1e}' \text{ of second}$$
$$z_{1e}' \text{ of 1st plate}=z_{1e} \text{ of the second}$$

so that the retardation of the second Savart double plate may be written $$\Delta^2=\frac{TD}{B}\sin i (\pm\cos a \mp \sin a)+T\left(\frac{1}{z_{ie}}-\frac{1}{z_{ie}'}\right)$$
$$+T\sin^2 i\left[\left(\frac{1}{z_{ie}A}-\frac{1}{z_{ie}'B}\right)\cos^2 a+\left(\frac{1}{z_{ie}B}-\frac{1}{z_{ie}'A}\right)\sin^2 a\right] \quad (36)$$

and the total retardation through both plates is $$\Delta=\Delta_1+\Delta_2=\frac{2TD}{B}\sin i \sin a \text{ if } a_2=a_1+90°$$

or $$\Delta=-\frac{2TD}{B}\sin i \cos a \text{ if } a_2=a_1-90° \quad (37)$$

The four plate device behaves in the linear manner that has been attributed to the double plate. Equation 37 is the polar equation of a straight line when $\Delta$ is constant, so the lines of the interference pattern will be truly straight. A significant point is that this is true for any value of $\theta$. Removing the abbreviations, and choosing $a_2=a_1+90°$, $$\Delta=2T\frac{(n_o^2-n_e^2)\sin\theta\cos\theta}{n_e^2\cos^2\theta+n_o^2\sin^2\theta}\sin i \sin a \quad (38)$$

Since phase shift, $\delta$ is given by $$\delta=\frac{2\pi\Delta}{\lambda}$$

$$\delta=\frac{4\pi T(n_o^2-n_e^2)\sin\theta\cos\theta}{\lambda(n_e^2\cos^2\theta+n_o^2\sin^2\theta)}\sin i \sin a \quad (39)$$

The cycle angle of the compensated plate (or the angle between points of equal phase shift along the line $a=90°$) is given by $$i_o=\sin^{-1}\frac{\lambda(n_e^2\cos^2\theta+n_o^2\sin^2\theta)}{2T(n_o^2-n_e^2)\sin\theta\cos\theta} \quad (40)$$

Obviously, if the other parameters are fixed, any cycle angle can be obtained by properly selecting $\theta$. For an angle measuring device, a large cycle angle is wanted and $\sin\theta\cos\theta$ should therefore be small. This can be accomplished either near $\theta=0$ or $\theta=90°$, but there is a reason why the region near $\theta=0$ is preferred. As $\theta$ approaches 90°, the normal ray through the plate is traveling near the direction of maximum birefringence perpendicular to the optic axis. In a crystal such as KDP, with a birefringence of .05, a wave need travel only the equivalent of 20 wavelengths in air to undergo a 360° phase shift. Since there are 8 surfaces in the compensated plate, a maximum error in flatness of $n\lambda$ in their surface could result in a retardation difference between two parallel rays emerging from different points on the plate of $8n\lambda$. If phase shift is to be uniform to within 1%, or 3.6°, over the area of a KDP plate cut near $\theta=90°$, the surfaces would have to be flat to within $1/40\lambda$, which for practical purposes is unachievable.

But if KDP plates are cut at $\theta=2°$ to a thickness of 1 mm. for individual plates, the birefringence along the plate normal direction is $10^{-4}$ and the surfaces need to be polished flat to only $12\lambda$ to hold error to 1%. The tolerances for matching plate thicknesses are also reduced proportionally. A KDP compensated plate cut at $\theta=2°$ would have a cycle angle of 9°58′42″ if the individual plate thicknesses are 1 mm.

The compensated Savart plate is illustrated at 12 on FIGURE 10 and comprises four plates 14, 16, 18 and 20. Each of the plates is cut from a uniaxial crystal in such a manner that the normal to the surface of each plate is greater than zero with respect to the optic axis of the crystal with each of the plates having the same angle. The plates 14, 16, 18 and 20 are superposed in a parallel stack such that the normal projections of the optic axes of the four plates upon the first surface of the combined plate are at one of the following set of angles with respect to the direction of the projection of the optic axis of the first plate upon the first surface of the combined plate; (a) 0°, 90°, −90° and 0°, (b) 0°, −90°, 90° and 0°, (c) 0°, 90°, 90° and 180°, or (d) at 0°, −90°, −90° and 180°. Positive angles indicate a counter-clockwise rotation of the indicated plate when an observer views it along its normal with the first plate nearest his eye. Conversely, negative angles indicate clockwise rotation under the same conditions. The aforementioned four angular relationships provide linearity. The interference pattern generated by the plate 12, when it is placed between polarizers and the combination of plate and polarizers is viewed in convergent or divergent light and the light transmitted through it is projected on a screen, consists of dark and light straight lines if the light is monochromatic and of continuously varying color if the light is polychromatic. The lines are perfectly straight and without curvature regardless of the direction in which the light passes through the plate 12. The angular separation in the case of monochromatic light or the angular rate of color variation when polychromatic light is used is determined by the angle at which the plates are cut from the uniaxial crystal, the thickness of the individual plates 14, 16, 18 and 20, and the birefringence of the crystal. Thus, a determination of thickness and birefringence allows a choice of angular line separation of the interference pattern by selecting the appropriate cutting angle. In the embodiment of FIGURES 9 and 10 the plates 14, 16, 18 and 20 are of equal thickness.

A three unit compensated Savart plate may be utilized in place of the four unit plate when the angular orientation of the four unit plate is 0°, 90°, 90° and 180°, or 0°, −90°, −90° and 180°. The three unit plate would have the first and third plates 14, 20 of identical thickness while the second plate 16, 18 would be of double thickness. The orientation of the second plate would be at either 90° or −90° while the first plate would have a 0° orientation and the third plate would have a 180° orientation. As shown in FIGURE 10, a cut and polishing is required between plates 16 and 18; however, this would be eliminated in a three plate system whereby plates 16 and 18 become a single plate.

In either of the described embodiments the individual plates may be cemented together and/or clamped in any conventional manner. A conventional frame 22 is shown in FIGURES 9 and 10 for securing the plates 14, 16, 18 and 20 together to form the compensated Savart plate 12.

When a pair of conventional Savart plates are cut from a single uniaxial crystal, the separate Savart plates may be joined in a superposed relation with one plate rotated 90° either clockwise or counter-clockwise to a position in which the optic axes of one of the Savart plates would be exactly parallel to the corresponding axes of the other Savart plate.

From the foregoing, it may be seen that the stacking of plates allows the obtaining of linearity from optical symmetry, while various cutting angles may be utilized to vary the spacing of the interference lines thereby allowing for the use of plates of increased thickness. When angles close to the optical axis are utilized, the birefringence, measured along the normals to the individual plates, may be decreased.

Cycle angles of 10° are made possible by the use of the compensated plate, thereby enabling its utilization in an angle sensing unit as a polarization modulation plate to alter the eccentricity of the polarization ellipse without changing its azimuth such that it is a first order function of the beam direction relative to the plate axis.

Although the invention has been described with reference to particular embodiments, it will be understood to those skilled in the art that the invention is capable of a variety of alternative embodiments within the spirit and scope of the appended claims.

I claim:

1. A linear birefringent combination plate comprising a series of more than two plates cut from a uniaxial crystal such that the normal to the surface of each plate is at the same angle which is greater than 0° with respect to the optic axis of said crystal, said plates being superposed and rotated relative to one another such that normal projections of the optic axes of said plates upon a first surface of the combined plate shall be at various angles which are multiples of 90° with respect to the direction of the projection of the optic axis of the first plate upon the first surface of the combined plate, the number of plates and rotation being chosen to provide optical symmetry and linearity.

2. A linear birefringent combination plate as defined in claim 1 wherein said series of plates comprise four plates of substantially the same thickness with said rotation relative to one another providing respective angular orientations of 0°, 90°, −90° and 0° for successive plates.

3. A linear birefringent combination plate as defined in claim 1 wherein said series of plates comprises four plates of substantially the same thickness with said rotation relative to one another providing respective angular orientations of 0°, −90°, 90° and 0° for successive plates.

4. A linear birefringent combination plate as defined in claim 1 wherein said series of plates comprise four plates of substantially the same thickness with said rotation relative to one another providing respective angular orientations of 0°, 90°, 90° and 180° for successive plates.

5. A linear birefringent combination plate as defined in claim 1 wherein said series of plates comprise four plates of substantially the same thickness with said rotation relative to one another providing respective angular orientations of 0°, −90°, −90° and 180° for successive plates.

6. A linear birefringent combination plate as defined in claim 1 wherein the angular line separation of the interference pattern of said combined plate when viewed in polarized light may be varied by varying the thickness of said plates.

7. A linear birefringent combination plate as defined in claim 1 wherein the angular line separation of the interference pattern of said combined plate when viewed in polarized light may be varied by varying the birefringence of said crystal.

8. A linear birefringent combination plate as defined in claim 1 wherein the angular line separation of the interference pattern of said combined plate when viewed in polarized light may be varied by varying the cutting angle measured between the normal to the plate surface and optic axis of said crystal.

9. A linear birefringent combination plate as defined in claim 1 wherein said series of plates comprises three plates, the first and third of which are of substantially the same thickness and the second of which is substantially double the thickness of either said first or third plates, said rotation relative to one another providing respective angular orientations of 0°, 90° and 180°.

10. A linear birefringent combination plate as defined in claim 1 wherein said series of plates comprises three plates, the first and third of which are of substantially the same thickness and the second of which is substantially double the thickness of either said first or third plates, said rotation relative to one another providing respective angular orientations of 0°, —90° and 180°.

11. A linear birefringent plate comprising a pair of Savart plates, each of which comprises two plates, all of said plates being cut from a uniaxial crystal, and means joining said pair of Savart plates in a superposed relation with one Savart plate rotated 90° about the plate normal with respect to a position in which the optic axis of one of said Savart plates is parallel to the corresponding axis of the other of said Savart plates.

12. A linear birefringent combination plate as defined in claim 1 wherein the angle from which said series of more than two plates are cut is determinative of the spacing of interference lines of the birefringent combination plate when viewed in polarized light.

References Cited

Van Heel: "Interferometry with Savart's Plate," Strong, Concepts of Classical Optics (W. H. Freeman & Co., San Francisco, Calif. 1958) pages 400–409.

DAVID SCHRONBERG, *Primary Examiner.*

P. R. MILLER, *Assistant Examiner.*

U.S. Cl. X.R.

350—12, 13, 147, 163; 88—14